Patented June 4, 1946

2,401,675

UNITED STATES PATENT OFFICE 2,401,675

LAMINATED FIBROUS SHEET MATERIAL

Harris O. Ware, Kalamazoo, Mich., assignor to Hercules Powder Company, Wilmington, Del., a corporation of Delaware No Drawing. Application January 17, 1942, Serial No. 427,180

9 Claims. (Cl. 154—50)

This invention relates to a new and improved laminated fibrous sheet material and to articles constructed from such material, and in particular relates to improved laminated paper structures in which milk casein is employed as the laminating adhesive.

At the present time, laminated fibrous sheet material, e. g., laminated paper or paper-board, laminated fiber-board, laminated asbestos sheet, etc., has acquired enormous commercial importance as a substitute for wood and metal in the manufacture of various articles of commerce. For example, in the packaging art, spirally wound laminated paper drums have come to replace wooden barrels or metal drums as shipping containers for many commodities. Similarly laminated paper or fiber tubes are used in certain arts to replace metal pipes or conduits, and various types of laminated sheet material are used for weather insulating, paneling, and other purposes in general building construction.

In the fabrication of laminated sheet material of this type, milk casein has several characteristics, e. g., low cost, ease of application, and freedom from toxicity, which render it suitable for use as the laminating adhesive. In spite of such desirable characteristics, however, casein adhesives have not proved entirely satisfactory for this purpose, primarily because of their poor water-resistance, which results in separation of the plies of the laminated sheet material when the latter is used or stored in the presence of moisture or moisture vapor. For example, considerable difficulty has been experienced with spirally-wound casein-laminated paper or paper-board drums because of their tendency to split or separate at the seams of the spiral windings when stored in damp or humid warehouses. Furthermore, since casein is an animal protein, laminated structures in which a casein laminating adhesive is employed are particularly subject to mold and bacterial growth between the several plies, i. e., at the very point where greatest strength is desired.

It is accordingly an object of this invention to provide a new and improved laminated fibrous sheet material in which casein is employed as the laminating adhesive base.

Another object is to provide casein-laminated fibrous sheet material which has improved resistance to ply-separation in the presence of moisture vapor.

A further object is to provide casein-laminated fibrous sheet material of improved resistance to mold and bacterial growth.

A still further object is to provide an improved laminated fibrous sheet type of shipping container.

Other objects will be apparent from the following detailed description of the invention, and many advantages other than those referred to herein will occur to those skilled in the art upon employment of the invention in practice.

I have found that the foregoing objects and attendant advantages may be realized through the use of a laminating adhesive consisting essentially of an aqueous alkaline solution or dispersion of milk casein to which has been added an ammonium or amine complex compound of zinc, cadmium, or magnesium. Such adhesive composition is a stable homogeneous solution or dispersion which is capable of drying to form highly water-resistant adherent casein films by what is believed to be the formation of a metallic caseinate. Furthermore, the casein films so formed are considerably less susceptible to mold and bacterial growth than those formed in the absence of the metal compound. Accordingly, laminated fibrous sheet material in which such composition has been employed as the laminating adhesive has greatly improved resistance to moisture vapor, and the plies thereof do not tend to separate even upon relatively long exposure to humid conditions. Also, it has improved resistance to weakening and deterioration brought about through mold and bacterial growth on the adhesive layers between the plies.

The adhesive compositions employed in fabricating the laminated fibrous sheet material in accordance with the invention may be prepared simply by dissolving milk casein in aqueous ammonia and thereafter adding an ammonium complex compound of zinc, cadmium, or magnesium in the form of an aqueous ammoniacal solution. Such solution is conveniently prepared simply by adding aqueous ammonia to an aqueous solution of a zinc, cadmium, or magnesium salt, e. g., zinc chloride, magnesium sulfate, cadmium bromide, zinc sulfate, cadmium nitrate, magnesium chloride, cadmium chloride, zinc nitrate, etc., until the initial precipitate of metal hydroxide is dissolved. Alternately, the casein may be dissolved or dispersed in a dilute aqueous alkali, e. g., sodium hydroxide, sodium carbonate, borax, potassium carbonate, etc., and the metal ammonium complex compound added in ammoniacal solution as described above. Also, a dry mixture of milk casein and a water-soluble zinc, cadmium, or magnesium salt may simply be stirred into aqueous ammonia until a homogeneous composition is obtained. Various addition agents, such as plasticizing agents, fillers, pigments, waxes, etc., may be added to adapt the compositions to a variety of specialized applications.

If desired, a water-soluble aliphatic primary amine, such as methylamine, propylamine, monoethanolamine, ethylene diamine, allylamine, etc. may be employed in place of ammonia in preparing the complex metallic compound. Thus, for example, zinc chloride may be dissolved in an aqueous solution of methylamine whereby there is formed a zinc methylamine complex compound, and the resulting solution may then be added to an alkaline solution or dispersion of milk casein to obtain a composition similar to those prepared as described above. Such compositions are particularly advantageous for use in cases where it is desired to avoid the presence of ammonia vapor.

The aqueous casein adhesive compositions may be of any suitable concentration but it will be found that those containing from about 10 to about 20 per cent by weight of solids are of most satisfactory viscosity for application to most types of fibrous sheet material. Similarly, the alkalinity of the composition is preferably maintained at a pH value about 11, since at higher alkalinities the compositions become somewhat inconvenient to handle and the casein has a tendency to hydrolyze or decompose.

The proportion of complex metallic compound required to render the casein sufficiently water-resistant depends upon the particular complex compound employed as well as upon the concentration of the alkaline casein solution. In most cases, however, sufficient of the complex compound to provide at least 0.03 mole of the metal ion per 100 grams of dry casein will be required, and in general from about 0.03 to about 0.30 or more, preferably from about 0.09 to about 0.12, mole of the metal ion per 100 grams of dry casein will be found to be most satisfactory.

The casein adhesive compositions prepared as described above may be applied to any fibrous sheet material, such as paper, paper-board, fiber-board, asbestos paper, felt, wood veneer, etc., in any suitable manner, e. g., by a doctor roll or blade, by brushing, spraying, etc., in making the laminated structures provided by the invention. For example, in the fabrication of laminated sheets, such as insulating board, paneling, plywood, and the like, the adhesive may be applied to each ply as the structure is built up either manually or mechanically with a brush or roller. When the desired number of plies have been laid, the structure may be placed in a press and dried in a current of warm air, or it may simply be allowed to dry in the open atmosphere. Thus, in making a three-ply paper-board sheet, the center board may be manually fed through a sheet paster machine which applies a coating of adhesive to both sides of the board with a roller coater, after which the facing boards are superimposed and the entire structure passed through a roll press and dried. In fabricating wound drums or tubes, the adhesive is preferably of somewhat lower viscosity since it is usually applied to the windings at high speed with a continuously-fed doctor blade or roller coater as they are wound around a mandrel.

In general, the particular manner in which the adhesive is applied and in which the laminated sheet material is built up will be the same as that employed with the adhesives heretofore known, and the variations in operation according to the type of material being laminated and the manner in which it is accomplished will be readily apparent to those skilled in the art.

The following example illustrates on way in which the principle of the invention may be applied, but is not to be construed as limiting the same.

*Example*

Approximately 135 parts by weight of substantially dry casein are allowed to soak in about 710 parts by weight of water for about ½ hour, after which there is added with stirring 7.5 parts by weight of 28 per cent aqueous ammonia. A solution of 15 parts by weight of zinc chloride in about 100 parts by weight of water and 35 parts by weight of 28 per cent aqueous ammonia is then added to the casein dispersion, and the mixture is stirred until smooth and homogeneous, after which it is thinned out with 200 parts by weight of water to render it of suitable viscosity for use on a high-speed pasting machine. The composition so prepared is then placed in the paste pot of a paper tube winding machine wherein it is fed by gravity to a roller coater which spreads it on the upper side of the plies of heavy paper or light paper-board as they are being wound around the mandrel. The tube may be wound with lapped seams, or it may be wound with butt seams and the next ply staggered so that it overlies the seams of the first ply. Also, if desired, the plies may be alternately wound spirally and convolutely, or they may be alternately wound spirally in opposite directions. When the desired number of plies have been laid, the flow of adhesive is shut off and the drum is given a finishing wind of lighter stock, e. g., kraft paper, and is slipped from the mandrel, and dried in a current of warm air. Upon drying, the tube is ready to be trimmed, fitted with a bottom, and crimped or otherwise finished in the usual manner to form a drum-type shipping container. Such drum will be found to be at least equal in rigidity and strength to drums in which the usual casein adhesives are employed, and at the same time will have greatly improved resistance to separation of the plies by reason of moisture vapor and mold or bacteria attacking the adhesive.

Other modes of applying the principle of my invention may be employed instead of those explained, change being made as regards the materials or methods employed, provided the product stated by any of the following claims, or the equivalent of such stated product, be obtained.

What I claim and desire to protect by Letters Patent is:

1. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein and a compound selected from the group consisting of ammonium and water-soluble primary aliphatic amine complex compounds of salts of one of the metals selected from the group consisting of zinc, cadmium, and magnesium, said complex compound being present in an amount between about 0.03 and about 0.3 mole of the metal ion per 100 grams of casein.

2. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein and a compound selected from the group consisting of ammonium and water-soluble primary aliphatic amine complex compounds of salts of zinc, said complex compound being present in an amount between about 0.03 and about 0.3 mole of the zinc ion per 100 grams of casein.

3. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein and a compound selected from the group consisting of ammonium and water-soluble primary aliphatic amine complex compounds of salts of cadmium, said complex compound being present in an amount between about 0.03 and about 0.3 mole of the cadmium ion per 100 grams of casein.

4. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein, and a compound selected from the group consisting of ammonium and water-soluble primary aliphatic amine complex compounds of salts of magnesium, said complex compound being present in an amount between about 0.03 and about 0.3 mole of the magnesium ion per 100 grams of casein.

5. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein and a compound selected from the group consisting of ammonium and water-soluble primary aliphatic amine complex compounds of salts of one of the metals selected from the group consisting of zinc, cadmium, and magnesium, said complex compound being present in an amount between about 0.09 and about 0.12 mole of the metal ion per 100 grams of casein.

6. A laminated fibrous sheet material suitable for making paper drums which is resistant to moisture and bacterial growth which comprises a plurality of superimposed fibrous sheets adhesively secured together with a composition consisting of an aqueous alkaline dispersion of casein and a water-soluble primary aliphatic amine complex compound of salts of one of the metals selected from the group consisting of zinc, cadmium, and magnesium, said complex compound being present in an amount between about 0.03 and about 0.3 mole of the metal ion per 100 grams of casein.

7. A laminated fibrous sheet material suitable for making paper drums which is resistant to moisture and bacterial growth which comprises a plurality of superimposed fibrous sheets adhesively secured together with a composition consisting of an aqueous ammoniacal dispersion of casein and a compound selected from the group consisting of ammonium and water-soluble primary aliphatic amine complex compounds of zinc chloride, the weight ratio of the zinc chloride to the casein being approximately 15 to 135.

8. A wound paper drum resistant to moisture and bacterial growth having its tubular side portion made up of a plurality of superimposed relatively thin spirally disposed fibrous sheets which have been adhesively secured together with a composition consisting of an aqueous ammoniacal dispersion of casein and an ammonium complex compound of salts of one the metals selected from the group consisting of zinc, cadmium, and magnesium, said complex compound being present in an amount between about 0.03 and about 0.3 mole of the metal ion per 100 grams of casein.

9. A wound paper drum resistant to moisture and bacterial growth having its tubular side portion made up of a plurality of superimposed relatively thin spirally disposed fibrous sheets which have been adhesively secured together with a composition consisting of an aqueous ammoniacal dispersion of casein and an ammonium complex compound of salts of one of the metals selected from the group consisting of zinc, cadmium, and magnesium, said complex compound being present in an amount between about 0.03 and about 0.3 mole of the metal ion per 100 grams of casein, and said composition containing from about 10 to about 20% by weight of solids, and having a pH below about 11.

HARRIS O. WARE.